United States Patent [19]
Udelle et al.

[11] Patent Number: 5,544,623
[45] Date of Patent: Aug. 13, 1996

[54] BALL AND TRACK FOR CATS WITH PIVOTING BASE

[76] Inventors: Steven D. Udelle; Laura L. Udelle, both of 26414 Barranquilla Ave., Punta Gorda, Fla. 33983

[21] Appl. No.: 454,402

[22] Filed: May 30, 1995

[51] Int. Cl.$^6$ ............................................. A01K 1/035
[52] U.S. Cl. ............................ 119/706; 119/707; 446/170
[58] Field of Search ........................... 119/702, 706, 119/707, 711; 446/131, 136, 168, 170, 396; 472/96, 97, 135

[56] References Cited

U.S. PATENT DOCUMENTS

| | | | |
|---|---|---|---|
| 2,004,915 | 6/1935 | Clark | 446/170 |
| 3,859,750 | 1/1975 | McKay | 446/170 |
| 4,517,922 | 5/1985 | Lind . | |
| 4,536,167 | 8/1985 | Hughes | 446/396 |
| 5,269,261 | 12/1993 | McCance | 119/706 |

*Primary Examiner*—Todd E. Manahan

[57] ABSTRACT

An animal amusement and scratching device causes a ball to be self-moving. The ball (16) is confined within a circular track of housing (10) and is viewable from the top opening (14) of the track by an animal. The slightly curved bottom edges (18) and (20) of the housing base causes the housing to be unstable. When a cat steps on any part of the device's upper surface to claw scratch on the carpeting (12), it will prompt the ball to roll by itself within the track when the unstable housing (10) rocks or teeters under a cat's weight. The unexpected movement of the ball attracts an animal into imminent play.

6 Claims, 3 Drawing Sheets

BALL AND TRACK FOR CATS WITH PIVOTING BASE

FIELD OF THE INVENTION

The present invention deals with animal amusement and claw scratching devices, but more particularly to an animal device that provides indirect or continuous motion of an object within the device as a compelling attraction to an animal, whereby an animal will frequent the device on its own initiative more often, thereby improving its physical condition, health, and mental alertness through its own efforts.

BACKGROUND—DISCUSSION OF PRIOR ART

U.S. Pat. No. 4,517,922 by Lind, May 21, 1985 shows a scratching device with a suspended lure that remains stationary, until moved. The tether is harmful when caught between a cat's toes. U.S. Pat. No. 5,269,261 by McCance, Dec. 14, 1993 shows a track and ball with a corrugated cardboard claw scratching means. Applicants have purchased this device and other ball track devices. The pet owner has to participate in moving the ball before a cat will join in. When the cat is claw scratching, the ball remains motionless and therefore does not present the incentive of motion. These purchased devices are seldom used, unless a human forces the ball into play. The above prior art devices are dormant when not in use. The prior art does not teach on the use of a motivational means that would exhibit an irresistible incentive or attraction to an animal, whereby the animal would benefit from increased use of the device more often. The present invention takes advantage of the inherent instincts of an animal's response to a moving object, when the original movement of the object is not physically initiated by the animal or human hand, but by the device.

SUMMARY OF THE INVENTION

Generally, the preferred embodiment of the present invention comprises an open circular track confining a ball within its U-shaped cavity. The center area of the track or loop contains a carpeted platform for claw scratching. The vertical oriented perimeter side of the track housing serves as the only contact with a floor surface and also serves as the base. The bottom of the base is curved so that when it is placed on a floor surface it will rock or teeter back and forth when a slight pressure is applied at any point of the top surface of the housing, thereby causing the ball or lure to move. Whenever an animal mounts the device for claw scratching, the lure ball will move due to the slight teetering of the device housing. The movement of the ball will always produce a reaction from the animal, whereby chasing or swatting the ball is imminent.

It is therefore an object of the present invention to provide an animal amusement and claw scratching device that does not require any direct contact with a lure ball by an animal or human hand to initiate a provocative movement of the lure ball.

It is an object of the present invention to have an animal expend its surplus energy, thereby developing improved muscle tone, alertness, coordination, and better sleeping habits.

It is an object of the invention that upon mounting the device, a cat will always respond to the moving lure.

It is another object that the animal amusement and claw scratching device would relieve the animal from boredom by providing more frequenting, thereby saving areas of household furniture from damage.

Other objects and advantages may be readily determined by the following descriptions.

COMPLETE DESCRIPTION OF THE INVENTION

Figure 1A:
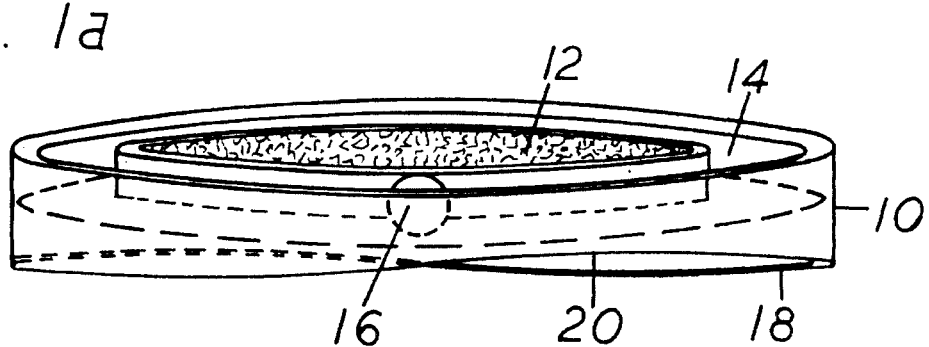
FIGS. 1a and 1b are perspective views of the preferred embodiment of the present invention.
Figure 1B:
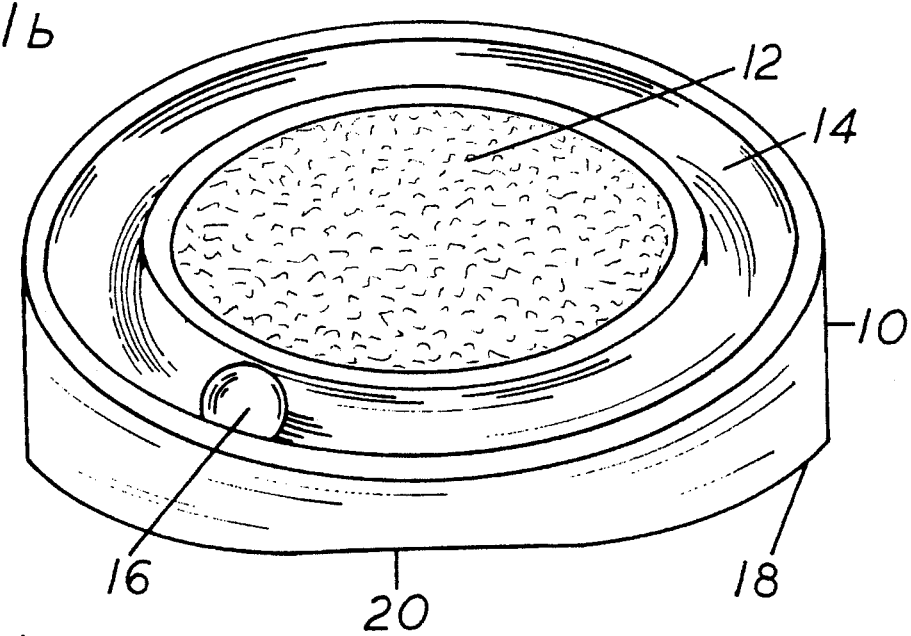

FIGS. 1a and 1b are perspective views of the preferred embodiment of the present invention, comprising a circular closed circuit, U-shaped perimeter housing 10, provided with a recess or cavity 14 for containing a movable object or lure ball 16 within the confines of the U-shaped perimeter housing. The center portion of the housing has a carpeted claw scratching platform 12. The outside vertical orientated portion of housing 10 serves as the base for the device. The bottom of the base is curved so that the device will provide a slight rocking or teetering motion between the bottom edges of base portions 20 and 18. The perimeter sides of housing 10 are higher at 18 than at 20.

Figure 1C:
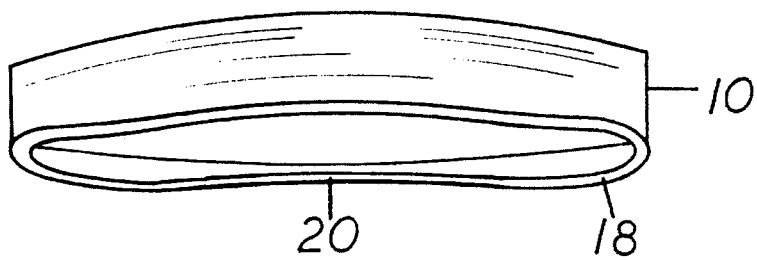
FIG. 1c is a perspective view of the curved bottom or base perimeter edge.

FIG. 1c is a perspective view of the bottom edge of the housing 10 base showing the widened inward edge of 18 and 20 to provide a flat surface for use on carpeted floors.

Figure 1D:
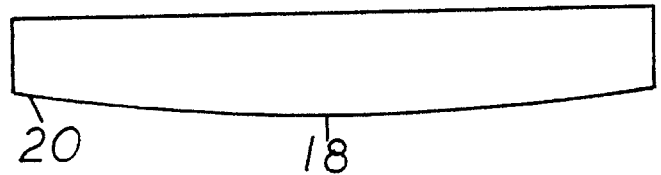
FIGS. 1d and 1e are several side plan views showing the curved bottom edge.
Figure 1E:
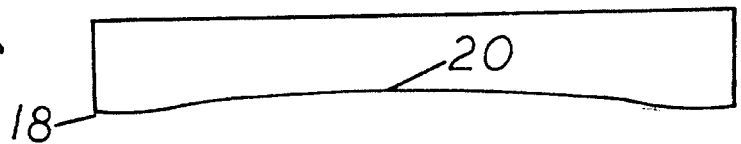

FIGS. 1d and 1e show several side plan views of the positions of curved base edges 18 and 20. When an animal, such as a cat, puts a slight pressure on the top of the device housing, the housing will tilt slightly, causing a solid plastic ball to move. This indirect motion of the ball lure provides an imminent response from the animal. When the animal is claw scratching on the carpeted platform, the ball will always move by itself. This concept of indirect motion of a lure provides more frequent response and activity from an animal than a human hand or animal directly moving a stationary ball lure on devices currently available.

Figure 2A:
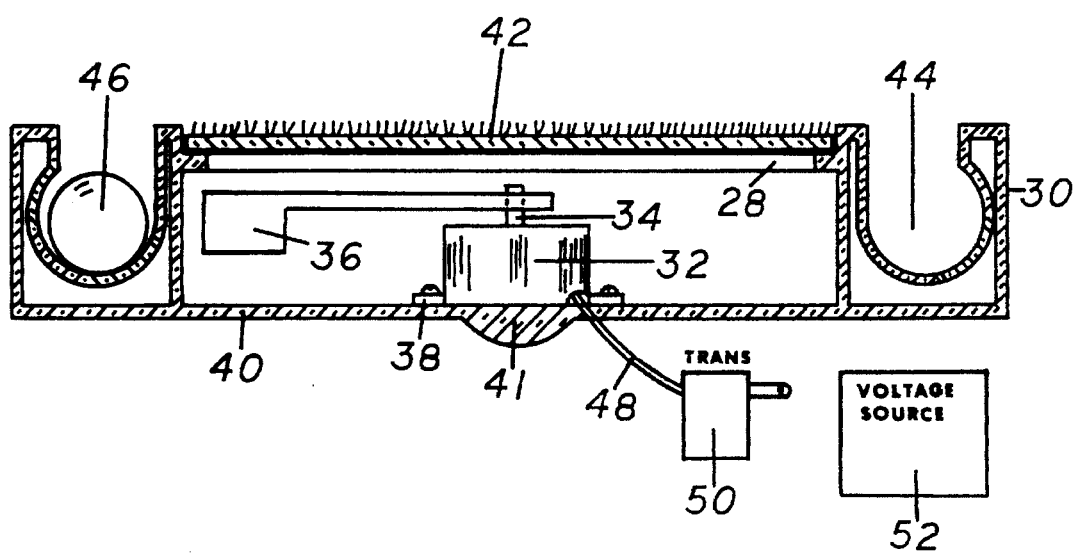
FIG. 2a is a side plan view of a first alternate embodiment of the present invention showing the housing in cross section utilizing a motor and weighted arm and a circular fulcrum.

FIG. 2a is a plan side view showing a first alternate embodiment of the present invention, comprising a housing 30 shown in cross section. The perimeter portion of housing 30 is comprised of a circular, closed circuit, U-shaped trough or cavity 44 containing a solid plastic ball or movable object 46 within the confines of the cavity 44 of the closed circuit portion of housing 30. The center portion of housing 30 includes a claw scratching carpeted platform 42 mounted to platform edge 28. The concealed interior of the device further includes a motor 32, a motor output shaft 34, an elongated, weighted arm 36 mounted at a right angle to the motor output shaft 34. The motor 32 is fastened by screws 38 to base 40. The bottom center of the base includes a circular curved fulcrum 41. The motor 32 is powered by low voltage via voltage source 52, transformer 50, and wiring 48. The low voltage is harmless if the wires are chewed by an animal.

Figure 2B:
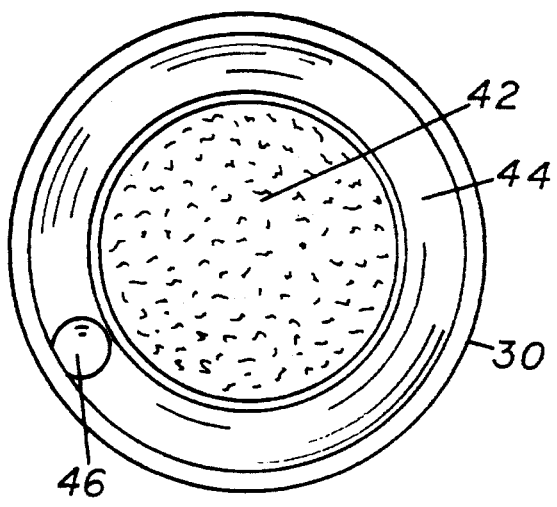
FIG. 2b is a top plan view of the alternate embodiment.

FIG. 2b is a top plan view showing a carpeted claw scratching platform 42, device housing 30, closed circuit U-shaped trough or cavity 44, and the movable object or lure 46.

Figure 2C:
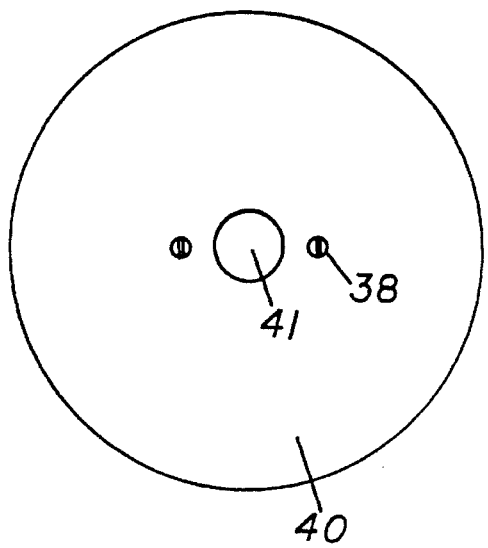
FIG. 2c is a bottom plan view of the alternate embodiment showing the circular fulcrum.

FIG. 2c is a bottom plan view of the base 40 showing the motor mounting fasteners 38, and the circular, rounded fulcrum 41.

This first alternate device provides continuous lure 46 movement as it orbits around the trough or cavity 44. The housing perimeter portion briefly contacts the floor surface as the weighted arm 36 rotates and slightly tilts the housing causing the ball lure to follow the rotation of the weighted arm 36. This device, when activated, is irresistible to a cat's inherent instincts to play or capture the ball. This device provides a strong motivational incentive. Rotational speeds of between one to twenty revolutions per minute are effective.

Figure 3A:
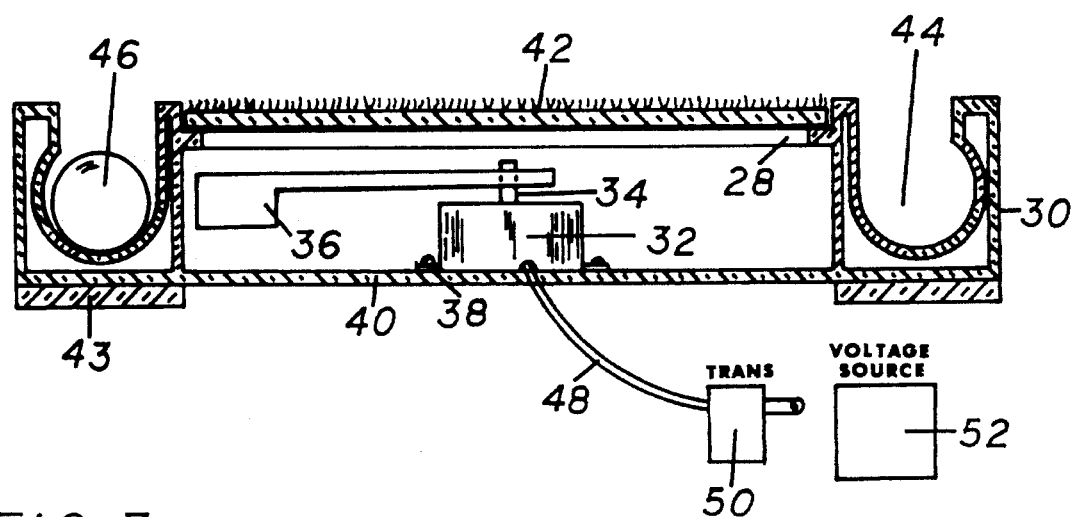
FIG. 3a is a side plan view of a second alternate embodiment of the present invention showing the housing in cross section, a plurality of fulcrums at the bottom of the housing base.

FIG. 3a is a side plan view of a second alternate embodiment of the present invention showing the device housing in cross section. This second alternate is the same as the first alternate as shown in FIG. 2a except for the absence of fulcrum 41. Two fulcrums 43 are at opposite bottom portions of the device base 40 to create a rocking or teetering effect, thereby producing a different ball lure movement than of FIG. 2a.

Figure 3B:
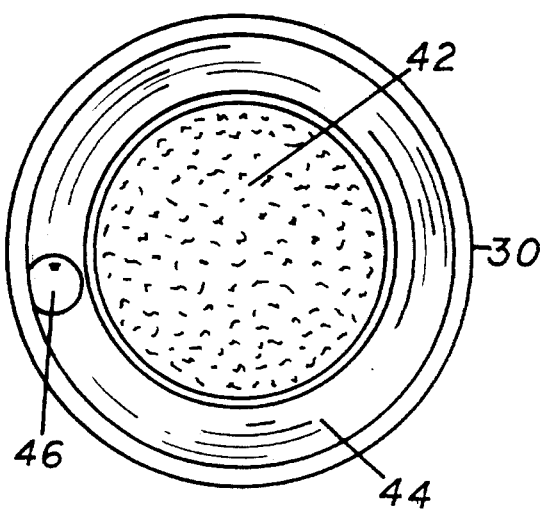
FIG. 3b is a top plan view of the second alternate embodiment.

FIG. 3b is a top plan view of the second alternate exactly as is shown in FIG. 2b.

Figure 3C:
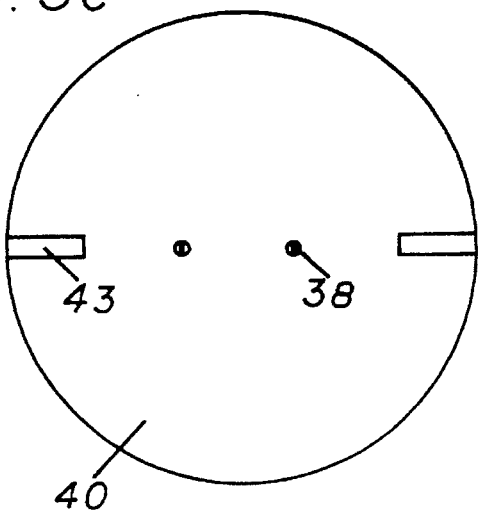
FIG. 3c is a bottom plan view of the second alternate embodiment showing a plurality of fulcrums.

FIG. 3c is a bottom plan view showing motor mounting fasteners 38, base underside 40, and several fulcrums 43. Rotational speeds of between one and twenty revolutions per minute are effective.

CONCLUSION

Thus, it has been shown that the action of the present invention solves the shortcomings of passive devices, past and present, thereby satisfying the consumers investment with a realistic and more frequently used product. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. A ball and track device for cats with pivoting base comprising:

a) a circular housing having an upper surface with an annular ring forming a continuous track encircling said upper surface of said housing, said continuous track having an inner wall, a substantially vertical outer wall, a bottom, and an open top;

b) said continuous track having a freely movable object disposed therein;

c) said substantially vertical outer wall of said continuous track having an arcuate lower edge extending between a first pair diametrically opposing points along the circumference of said housing, the height of said outer wall at said first pair of diametrically opposing points being less than the height of said outer wall at a second pair of diametrically opposing points disposed at ninety degrees with respect to said first pair of diametrically opposing points such that the lower edge of said outer wall forms a convex rocker-like base for said housing, said rocker-like base providing an unstable platform for said housing, whereby when an animal contacts said housing, said housing is caused to rock on said rocker-like base indirectly causing said freely movable object to move within said annular track.

2. The device of claim 1, wherein said upper surface of said housing includes means for permitting an animal to sink its claws therein and thus function as a scratching pad for said animal.

3. The device of claim 1, wherein said freely movable object is comprised of a ball.

4. The device of claim 1, further comprising a shaft below said upper surface of said housing and means for rotating said shaft disposed within said housing.

5. The device of claim 4, wherein said shaft is coupled at a right-angle to an elongated arm employing a weight remote from said shaft.

6. The device of claim 4, wherein said means for rotating said shaft is an electric motor.

* * * * *